United States Patent [19]
Stephens et al.

[11] 3,897,534
[45] July 29, 1975

[54] METHOD OF FIXING SHAFT TO HAMMER HEAD

[75] Inventors: Michael Jeffery Stephens, Solihull; Leslie Hill, Birmingham, both of England

[73] Assignee: Thor Hammer Ltd., Birmingham, England

[22] Filed: Sept. 13, 1973

[21] Appl. No.: 397,057

[30] Foreign Application Priority Data
Sept. 13, 1972 United Kingdom............... 42409/72

[52] U.S. Cl. ................... 264/230; 29/451; 29/525; 145/29 R; 403/273; 264/249
[51] Int. Cl. ............................................. B29c 13/00
[58] Field of Search ............ 29/451, 525, 509, 447; 254/26 R; 264/230, 249; 145/29 R; 403/6, 242, 263, 261, 273, 381, 383

[56] References Cited
UNITED STATES PATENTS

| | | |
|---|---|---|
| 2,041,518 | 5/1936 | Salz................................. 264/249 X |
| 2,252,504 | 8/1941 | Hahn .................................. 264/230 |
| 2,806,230 | 9/1957 | Mesko........................... 254/26 R X |
| 3,613,753 | 10/1971 | Wolf.............................. 145/29 R X |

FOREIGN PATENTS OR APPLICATIONS 728,480  2/1966  Canada............................ 145/29 R Primary Examiner—Charlie T. Moon
Attorney, Agent, or Firm—A. Yates Dowell, Jr.

[57] ABSTRACT

A method of fixing a shaft made of plastics material (e.g. polyethylene) in the hole which extends through the metal head of a hammer comprising providing a moulded shaft having an end larger in cross-section than the hole in the head, compressing this end between dies in a press to reduce its cross-section to slightly oversize in relation to the hole and then forcibly driving this reduced end of the shaft into the hole in the head.

3 Claims, 8 Drawing Figures

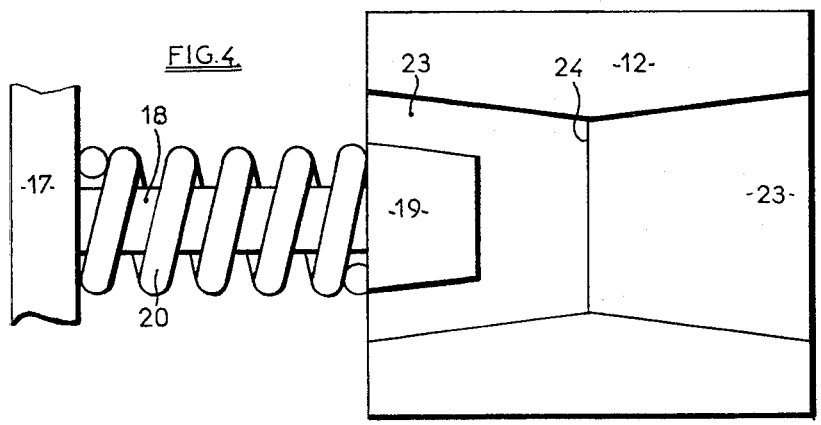
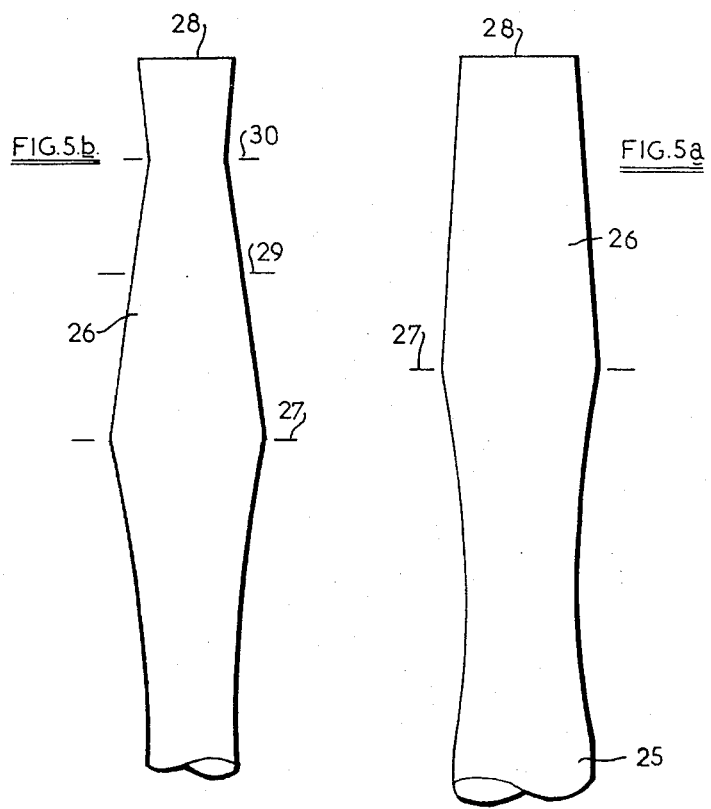

METHOD OF FIXING SHAFT TO HAMMER HEAD

BACKGROUND OF THE INVENTION

This invention relates to hammers of the type comprising a head and a shaft with one end of the shaft being fixed in a hole extending transversely through the head of the hammer. The hole through the head is generally of waisted form so that its internal cross-section is smaller at the centre of the hole than it is at the two ends of the hole. In other forms the hole may be generally parallel sided, of any convenient cross-section, or it may be tapered from one end to the other. The present invention is concerned with such hammers wherein the shaft is made of plastics material and hereinafter such hammers are referred to as being "of the type specified".

Thermoplastics materials which are suitable for forming the shafts of hammers of the type specified have the property of "memory" whereby the material, after being deformed under pressure from an original shape in the cold (i.e. without application of heat), tends to return to that original shape after the deforming pressure has been removed. The present invention is concerned with shafts made of such plastics materials which exhibit the property of memory to a marked degree such as, for example, polyethylene, nylon, polypropylene and ABS (acrylonitrile butadiene styrene), and the expression "plastics material" as used in the appended claims refers only to such plastics materials.

The object of the invention is to provide a new or improved method for fixing a shaft of plastics material in the head of a hammer of the type specified.

SUMMARY OF THE INVENTION

According to the invention a method of fixing a shaft of plastics material in the head of a hammer of the type specified comprises providing a hammer head having a hole extending therethrough for reception of the end of a shaft, providing a preformed shaft of plastics material, one end portion (namely the end portion to be fixed in the head) of which is substantially oversize in cross-section in relation to the hole through the head, compressing said end portion to reduce its cross-sectional area and immediately fitting said reduced end portion in the hole in the head.

Preferably, the compression reduces the end portion to a cross-sectional size which is still slightly oversize in relation to the minimum cross-section of the hole in the head. The fitting of the shaft to the head may then be done by placing the shaft in axial alignment with said hole and with said end portion in or adjacent one end of the hole and applying axially directed force to drive the end portion through the hole, such operation being performed immediately after the compression operation. The inherent elasticity of such plastics materials permits of this force fitting and further compression of the end portion of the shaft.

The tendency to expansion of the end portion of the plastics material handle by virtue of the memory characteristic of the plastic results in the material of the end portion expanding to wholly fill any gaps which may be left between the wall of the hole through the head and the end portion of the shaft. At this stage alone the fixing is satisfactory but if it is desired to further safeguard the fixing between the head and the handle the following further step may be applied to the method.

With the shaft of the handle firmly gripped and located at a position immediately below the head the hammer may be placed in a suitable press and the press operated to apply axial force to the extreme end portion which projects from one side of the head so as to deform the plastics material still further into tight engagement with the hole through the head. Alternatively, this operation may be performed manually by placing the hammer in an inverted position on a rigid surface and striking one or more blows on the end of the shaft.

BRIEF DESCRIPTION OF THE DRAWINGS

One example of apparatus for carrying out the method of the invention is illustrated in purely diagrammatic form in the accompanying drawings wherein:

FIG. 4 is a plan view on an enlarged scale of the bottom die of the press, FIG. 5a is a view showing the end portion of the pre-moulded shaft before operation in the press, FIG. 5b is a view to the same scale showing the shaft after the first operation in the press.

It will be appreciated that the drawings of the apparatus are purely diagrammatic and the invention is not restricted in scope to the particular details of apparatus shown and described hereinafter.

DESCRIPTION OF THE PREFERRED EMBODIMENT

Figure 1:
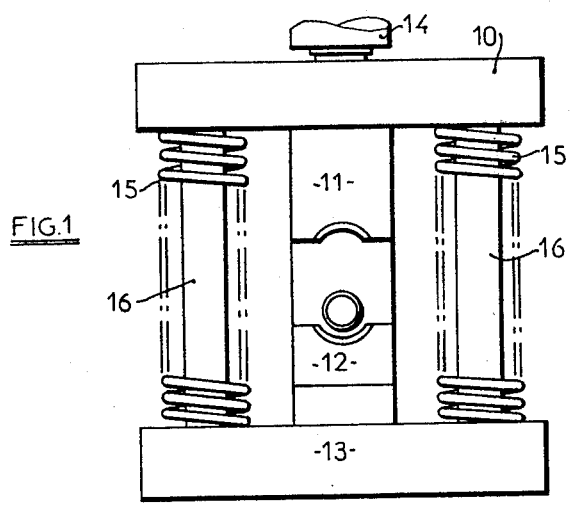
FIG. 1 is a front elevation of a press for carrying out the initial compression operation, the dies of the press being shown in the open condition.
Figure 2:
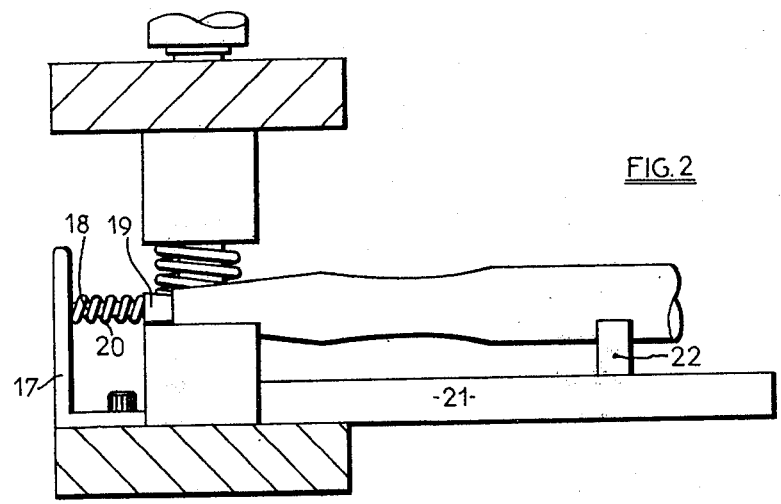
FIG. 2 is a side elevation on FIG. 1 with the dies in the open position and a pre-moulded shaft of a hammer in position.
Figure 3:
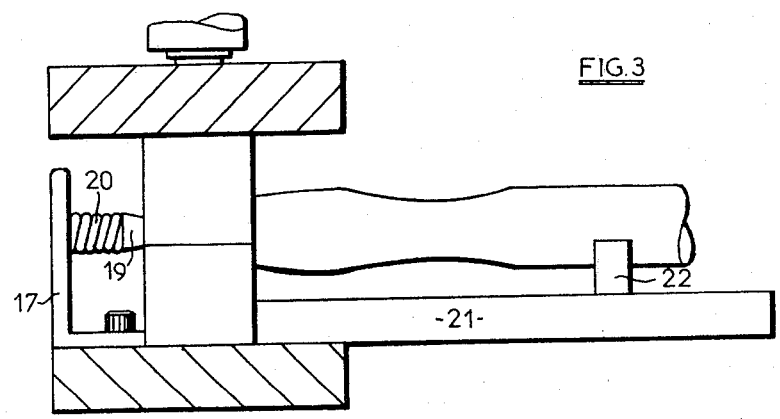
FIG. 3 is a view similar to FIG. 2 but showing the dies in the closed position.

The apparatus shown in FIGS. 1, 2 and 3 comprises a press having a top plate 10 movable up and down and to which is secured the upper die part 11 and a fixed and rigid bottom plate 13 to which is secured the lower die part 12. The press mechanism indicated generally at 14 causes vertical downwards movement of the upper plate 10 to close the die parts 11 and 12 together against the resistance of return springs 15 located about guide pillars 16 fixed at their lower ends to the bottom plate 13 and sliding through suitable apertures in the top plate 10.

At the rear, the bottom plate 13 has rigidly secured thereto a vertically extending back plate 17 in which is slidably mounted a back stop rod 18 having fixed to its forward end a backstop 19 (more clearly seen in FIG. 4), the backstop 19 being urged forwardly towards the front of the press so that when the dies are apart and empty the backstop 19 occupies the position shown in FIG. 4 in which it projects part way into the cavity of the bottom die part 12.

A fixed support 21 extends forwardly and horizontally from the bottom plate 13 of the press and at a suitable position spaced from the bottom die part 12 it has fixed on its upper surface a support 22 for the shaft of the hammer, said support 22 having a part-circular recess in its upper face so that it supports the lower end portion of the shaft as shown in FIGS. 2 and 3.

As will be seen from the plan view of FIG. 4, the bottom die part is in the plan view of waisted form and is symmetrical about the centre line 24 which defines the area of smallest cross section of the die cavity. The two parts of the die cavity 23 on either side of the centre line 24 are of part-circular form in cross section and decrease progressively in cross-sectional area from their outer edges to the centre line 24. The configuration of the other die part 11 and its cavity is the same as the lower die part 12 and it will, therefore, be appreciated that when two parts are closed together as in FIG. 3 they define an enclosed die cavity which is of substantially oval cross-section and waisted formation with the oval cross-section decreasing progressively from the two ends of the die cavity inwardly towards the center plane defined by the centre lines 24 of the two die cavities.

Also, as will be seen from FIGS. 2 and 4, with the die parts in the open position and prior to the placing of a shaft in the press, the backstop 19 projects approximately halfway into the rear half die cavity 23.

The performance of the first step of the operation in the apparatus so far described is as follows. There is first provided a moulded plastics shaft of which the end portion to be fitted in the hammer head is of the form shown in FIG. 5a. The remainder of the length of the shaft beyond the parts numbered at 25 is of any convenient shape in cross section and may, if desired, be fitted with a hand grip cover portion according to user requirements.

The end portion 26 which is to be fitted in the hole in the hammer head has a generally frusto-conical form with a maximum diameter on the plane 27 and minimum diameter at the extreme end 28. The cross-sectional shape of the portion between the plane 27 and end 28 may be of any convenient form but is generally of oval form and the area of cross-section of the extreme end 28 is substantially in excess of the minimum area of cross-section of the hole through the handle head. It will be appreciated that the shaft being here described is suitable for fitting to a hammer head wherein the hole through the hammer head is of a waisted cross-section and of the same general type of configuration as the waisted cross-section of the die cavity formed by the die parts 11 and 12.

The shaft from FIG. 5a is then placed inbetween the open die parts 11 and 12 in the manner shown in FIG. 2 so that the extreme end 28 is engaging the face of the end stop 19 and the remainder of the shaft 25 rests upon the support 22. As will be apparent from a consideration of the showing of the end portion seating in the lower die part 12, as shown in FIG. 2, it will be apparent that this end portion is also substantially oversize in relation to the area of cross-section of the die parts with the result that when the dies are brought together into the position of FIG. 3 substantial compression of the parts 26 takes place with the result that the plastics material is extruded endwise in opposite directions from between the open ends of the two die parts.

FIG. 5b shows the shape of the end part immediately after removal from between the die parts from which it will be observed that the parts 26 between the extreme end 28 and the plane 27 has been extended due to the extrusion outwardly of the plastics material and has been substantially reduced in cross-section and has also been formed to a waisted configuration at the end part between the extreme end 28 and the plane 29 as shown in FIG. 5b. The end part of the shaft between the extreme end 28 of the plane 29 in FIG. 5b now corresponds to the die cavity between the closed die parts 11 and 12 and the centre plane 30 of this end part corresponds to the centre plane 24 of the two die parts. It will be appreciated that the extrusion of the plastics material in the direction rearwardly of the die parts results in a rearwards movement of the backstop 19 against the resistance of its spring 20.

Figure 6:
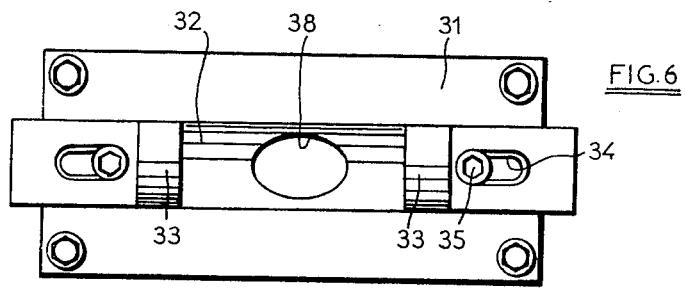
FIG. 6 is a plan view of a tool for performing the second operation of fixing the shaft in the head.
Figure 7:
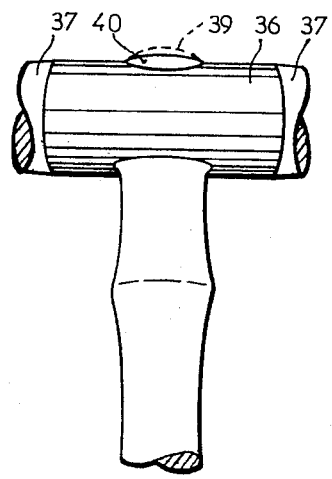
FIG. 7 is a fragmentary view of a completed hammer assembly.

The next step in the operation of the method which takes place immediately after removing the shaft from the press makes use of the tooling which is illustrated diagrammatically in plan view in FIG. 6. Such tooling comprises a block 31 having extending from end to end thereof a shallow part-cylindrical recess 32 and in each end of such recess 32 there is adjustably mounted an end stop 33. Each end stop 33 has an elongated slot 34 through which passes a locking bolt 35 screwing into the block 31 so that the position of each end stop can be adjusted according to the overall length of the hammer head which is to be assembled. The inner face of each end stop 33 is of circular form and flat and the head of the hammer is inserted between the end stops 33 which, as previously mentioned, are adjusted to accommodate any particular size of head. The head of the hammer, as indicated in FIG. 7, is of generally cylindrical form and may be a conventional form of head with striking faces integral therewith or may, as illustrated in FIG. 7, be the type of head which may be subsequently provided with replaceable striking faces 37.

The base of the shallow part-cylindrical recess 32 has centrally thereof an aperture 38 extending therethrough and of generally oval cross-section and the hammer head is placed between the end stops 33 so that the hole through the hammer head is aligned axially with the hole 38. The shaft from FIG. 5a is then held vertically above the hammer head and with the shaft in line axially with the hole through the head and this end portion of the shaft is then driven through the hole by means of a number of blows struck with a suitable tool upon the upper end part of the shaft.

The result is that the plastics material of the end part of the shaft is further deformed in being forceably driven through the hole in the hammer head and a portion of the plastics material projects outwardly from the hole in the head and is accommodated in the aperture 38 through the base of the block 31. Such projecting portion of plastics material is indicated by the dotted lines at 39 in FIG. 7. As a final operation this projecting part 39 may be somewhat flattened to the form indicated at 40 in FIG. 7 and this may be done simply by holding the hammer in a vertical inverted position with the part 39 resting upon a rigid surface and then striking the upper end of the shaft of the hammer a number of blows to flatten the part 39.

In the production of an assembled hammer in which the hole through the hammer head is of parallel sided form the dies will be of simple part-cylindrical configuration and parallel sided and the initial pre-moulded shaft will have an end portion which is of cylindrical form but substantially oversize in relation to the area of cross-section of the hole through the hammer head. The operation of compressing this end portion would reduce the area of cross-section and also cause elongation by extrusion of the plastics material, the reduced area of cross-section being still slightly oversize in relation to the hole through the hammer head so that this reduced end portion can then be driven into the hammer head using the tooling in FIG. 6 and in the manner above described. With such form of hammer head, in order to provide additional security, there is preferably formed annular grooves and/or projections on the surface of the hole through the hammer head so that after being driven therethrough the plastics material of the end portion of the shaft will upon recovery enter into grooves and lock with such projections to provide a firm mechanical key between the shaft and the head.

We claim:

1. A method of fixing a shaft of plastics material in the head of a hammer of the type specified comprising providing a hammer head having a hole of waisted form extending therethrough for the reception of the end of a shaft, providing a preformed shaft of plastics material of an elastic memory type, one end portion, namely the end portion fixed in the head, of which is substantially oversize in cross-section in relation to the hole through the head, compressing said end portion in the cold to waisted form and to reduce its cross-sectional area such that the maximum cross-sectional area of said reduced end portion is only slightly greater than the minimum cross-sectional area of the hole through the hammer head, immediately following upon said operation of compression, force fitting said reduced end portion into the hole in the head by the application of force applied axially of the shaft, and allowing said compressed reduced end portion to elastically expand within the hole in the head of the hammer.

2. A method of fixing a shaft of plastics material in the head of a hammer of the type specified comprising providing a hammer head having a hole of waisted form extending therethrough for the reception of the end of a shaft, providing a preformed shaft of plastics material of an elastic memory type, one end portion, namely the end portion fixed in the head, of which is substantially oversize in cross-section in relation to the hole through the head and is of frusto conical form, the smaller cross-sectional area of which is at the extreme end of such end portion, compressing said end portion in the cold to waisted form and to reduce its cross-sectional area such that the maximum cross-sectional area of said reduced end portion is only slightly greater than the minimum cross-sectional area of the hole through the hammer head, immediately following upon said operation of compression, force fitting said reduced end portion into the hole in the head by the application of force applied axially of the shaft and allowing said compressed reduced end portion to elastically expand within the hole in the head of the hammer.

3. A method of fixing a shaft of plastics material in the head of a hammer of the type specified comprising providing a hammer head having a hole of waisted form extending therethrough for the reception of the end of a shaft, providing a preformed shaft of plastics material of an elastic memory type, one end portion, namely the end portion fixed in the head, of which is substantially oversize in cross-section in relation to the hole through the head, compressing said end portion in the cold to waisted form and to reduce its cross-sectional area such that the maximum cross-sectional area of said reduced end portion is only slightly greater than the minimum cross-sectional area of the hole through the hammer head, immediately following upon said operation of compression, force fitting said reduced end portion into the hole in the head by the application of force applied axially of the shaft so that a portion of the extreme end of the shaft projects from the hole in the head, allowing said compressed reduced end portion to elastically expand within the hole in the head of the hammer, and applying axial force to said projecting portion so that it is axially reduced in length and radially expanded.

* * * * *